April 17, 1945.  P. L. JULIAN ET AL  2,373,686
PHOSPHATIDE PRODUCT AND METHOD OF MAKING
Filed July 15. 1942

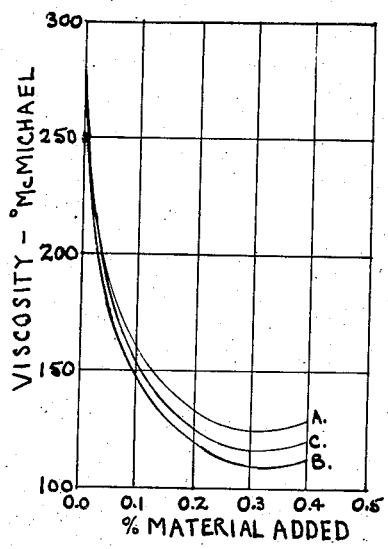

GRAPH No. 1.

CHOCOLATE VISCOSITY REDUCTION
MIXED SOYBEAN PHOSPHATIDES
A - UNTREATED PHOSPHATIDE.
B - PHOSPHATIDES - DIAZOMETHANE
C - PHOSPHATIDES - FORMIC ACID -
    FORMALDEHYDE

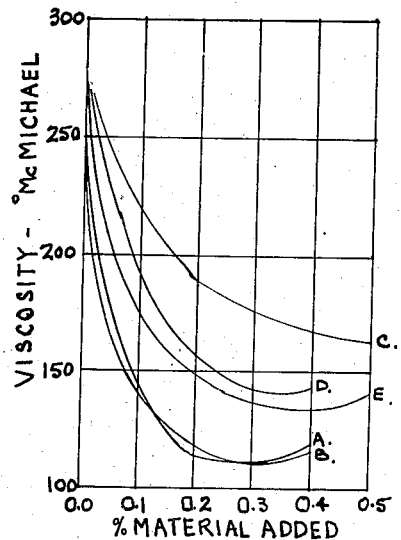

GRAPH No. 2.

CHOCOLATE VISCOSITY REDUCTION
SOYBEAN PHOSPHATIDES
A - LECITHIN - UNTREATED
B - LECITHIN - DIAZOMETHANE
C - CEPHALIN - UNTREATED
D - CEPHALIN - DIAZOMETHANE
E - CEPHALIN - FORMIC ACID —
    FORMALDEHYDE.

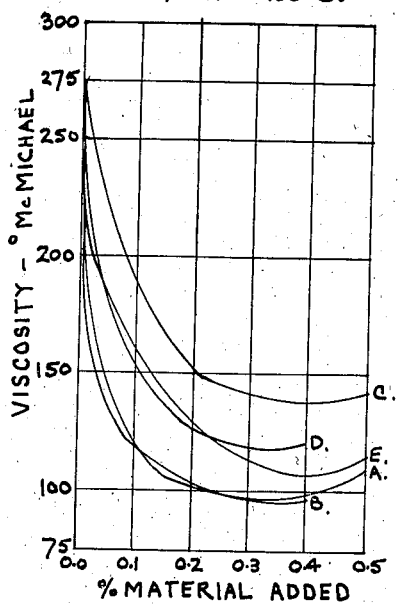

GRAPH No. 3.

CHOCOLATE VISCOSITY REDUCTION
BEEF BRAIN PHOSPHATIDES
A - LECITHIN - UNTREATED
B - LECITHIN - DIAZOMETHANE
C - CEPHALIN - UNTREATED
D - CEPHALIN - DIAZOMETHANE
E - CEPHALIN - FORMIC ACID - FORMALDEHYDE

PERCY L. JULIAN, EDWIN W. MEYER
AND HERBERT T. IVESON, INVENTORS

BY Charles F. Carney
ATTORNEY

UNITED STATES PATENT OFFICE 2,373,686

PHOSPHATIDE PRODUCT AND METHOD OF MAKING

Percy L. Julian, Maywood, Edwin W. Meyer, Evanston, and Herbert T. Iveson, Chicago, Ill., assignors, by mesne assignments, to American Lecithin Company, Cleveland, Ohio, a corporation of Ohio Application July 15, 1942, Serial No. 450,985

8 Claims. (Cl. 260—403)

The present invention relates to the methylation of cephalin and cephalin containing mixtures of phosphatides.

It is known that phosphatides such as soybean phosphatides when used in chocolate in small amounts result in a lowering of the viscosity of the molten chocolate. Soybean phosphatides consist essentially of a mixture of lecithin and cephalin and applicants have observed that when these isolated individual phosphatides are used in chocolate that lecithin has a greater viscosity reducing action than cephalin. As cephalin occurs in substantial quanities in natural soybean phosphatides as well as in the phosphatides from other sources, it is highly desirable to increase the chocolate reducing viscosity of cephalin as well as mixtures of phosphatides containing cephalin.

It is accordingly an object of the present invention to treat cephalin and phosphatide mixtures containing cephalin to produce products having improved chocolate viscosity reducing power.

Another object is to produce new products from cephalin which possess increased chocolate viscosity reducing power.

One formula proposed for lecithin is as follows:

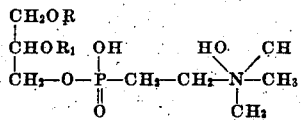

and that for cephalin is supposed to be

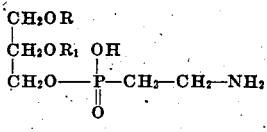

It will be noted that lecithin is a quaternary ammonium compound in which three methyl groups and a basic hydroxyl group are attached to the nitrogen group, and that cephalin differs therefrom in being a primary amine.

Applicants have found that upon treatment of cephalin with methylating agents that the resulting product produces a greater reduction in the viscosity of chocolate than the untreated cephalin. Lecithin similarly treated does not show any noticeably increased chocolate viscosity reducing power. There are two places where methylation of the cephalin might occur. These are on the acidic hydroxyl group attached to the phosphorus, or on the amino group. Since lecithin also contains an acidic hydroxyl group and already contains three methyl groups attached to the nitrogen it would appear that methylation of the cephalin takes place on the amino group.

It is not necessary to treat pure cephalin as mixtures containing cephalin may be treated, such as the natural soybean phosphatide mixture.

EXAMPLE I

Crude soybean phosphatides were washed with acetone until oil free. The oil free phosphatides were then dried and analyzed. A part of the dried phosphatides were then dissolved in refined soya oil to make a mixture containing 70% phosphatides. The oil-phosphatide mixture was then added to chocolate in various amounts to determine the viscosity reducing action of the resulting mixture. The viscosity was measured by means of the McMichael viscosimeter. 160 grams of chocolate giving a 3 cm. immersion on a 2 cm. bob were used with a #26 wire at 100° F. Duplicate runs were made on both the analysis and in the viscosity tests.

10 grams of the oil free soybean phosphatides were dissolved in anhydrous ether and 0.03 mole of diazo-methane in anhydrous ether was added slowly with shaking and the mixture allowed to stand overnight. The ether solution was then vacuum dried and a portion analyzed for nitrogen and phosphorous. The remainder was then dissolved in soya oil to form a 70% solution and this mixture used in the test for the chocolate viscosity reducing power under the same conditions as above, duplicate runs being made.

To a further 37.5 grams of the oil-free phosphatides was added 12 grams of formic acid (98%) and 3.3 grams of formaldehyde (37.5%). This mixture was stirred for two hours on a steam bath, at the end of which time the material was dissolved in hexane, and washed with water containing a small amount of salt to prevent emulsification. After removal of the excess formic acid and formaldehyde the hexane solution was concentrated and dried under vacuum. The dried material was analyzed, the remainder dissolved in refined soya oil to a 70% solution and the chocolate viscosity reducing power determined as above, duplicate runs being made.

The results of the foregoing experiments are shown in Table I and the viscosity reducing action is further shown graphically in graph No. 1. Averages for the duplicate runs are used.

A caution should be observed in treating the mixtures against having present any materials which would prevent the methylation of the cephalin taking place. Thus when cephalin and cephalin mixtures containing soybean oil are treated with diazo methane, the diazo methane is used up by reaction with the oil before it has a chance to react with the cephalin.

EXAMPLE II

The experiments of Example I were repeated on alcohol extracted soybean lecithin and on soybean cephalin.

Oil free soybean phosphatides were extracted with alcohol and the alcoholic extracts concentrated under vacuum and dried. The lecithin thus produced was analyzed and a portion dissolved in refined soybean oil to a 70% solution and the chocolate viscosity reducing power determined, duplicate runs being made.

Another portion of the soybean lecithin was treated with diazo methane as in Example I,

TABLE I

*Effect of methylation of phosphatides*

| Material added | Analysis | | Chocolate viscosity— ° McMichael per cent material added | | | | | |
|---|---|---|---|---|---|---|---|---|
| | % N | % P | 0.0 | 0.1 | 0.2 | 0.3 | 0.4 | 0.5 |
| Mixed oil-free soybean phosphatides. | 1.15 | 3.21 | 280 | 171 | 139 | 126 | 131 | |
| Diazomethane on mixed oil-free soybean phosphatides. | 1.06 | 2.99 | 280 | 160 | 119 | 110 | 113 | |
| Formic acid, formaldehyde on mixed oil-free soybean phosphatide. | 1.00 | 2.91 | 280 | 168 | 126 | 114 | 118 | |
| Soybean lecithin | 1.50 | 3.24 | 280 | 137 | 118 | 109 | 117 | |
| Diazo methane on soybean lecithin. | 1.48 | 3.24 | 280 | 142 | 114 | 111 | 115 | |
| Soybean cephalin | 1.00 | 3.00 | 280 | 221 | 187 | 175 | 167 | |
| Diazomethane on soybean cephalin. | 0.90 | 2.96 | 280 | 193 | 157 | 143 | 147 | |
| Formic acid, formaldehyde on soybean cephalin. | 0.85 | 2.93 | 280 | 172 | 151 | 137 | 136 | 140 |
| Beefbrain lecithin | 1.72 | 2.93 | 280 | 119 | 101 | 99 | 99 | 108 |
| Diazomethane on beefbrain lecithin. | 1.72 | 2.92 | 280 | 117 | 103 | 98 | 99 | |
| Beefbrain cephalin | 1.83 | 3.27 | 280 | 187 | 149 | 142 | 141 | 143 |
| Diazo methane on beefbrain cephalin. | 1.80 | 3.21 | 280 | 159 | 126 | 118 | 120 | |
| Formic acid, formaldehyde on beefbrain cephalin. | 1.79 | 3.21 | 280 | 161 | 128 | 110 | 108 | 113 | the reaction product analyzed and the viscosity reducing power determined as above.

The alcohol insoluble cephalin fraction left after the alcohol extraction was dissolved in ether and purified by precipitation in an excess of acetone, and then in an excess of ethyl alcohol. It was then dried and the cephalin thus prepared was analyzed and tested for chocolate viscosity reducing power.

The diazomethane-cephalin reaction product was then made as previously and the analysis and chocolate viscosity reducing power run in duplicate.

The reaction using formic acid and formaldehyde as the methylating agent for the soybean cephaline was also tried, and the analysis and chocolate viscosity reducing power test made as previously.

The results are shown in the Table I and the viscosity reducing action is further shown graphically in graph No. 2.

EXAMPLE III

Lecithin and cephalin were prepared from beef brains according to the method of Levene, Jr. Biol. Chem. 46 pp. 353–65 (1921) and the same tests made as in Example 2. The results are shown in the table and the chocolate viscosity reducing power is further shown graphically in graph No. 3.

A study of the table and graphs definitely indicate that methylation of the cephalin occurs, that lecithin is not methylated and that the methylated cephalin possesses greater chocolate viscosity reducing power than the untreated material. As previously stated methylation probably occurs at the amino group. Buck and Bottly in an article—"Preparation of Secondary Amines," J. Am. Chem. Soc. 63, pages 1964–66 (1941) employed a mixture of formic acid and formaldehyde to methylate primary amines and advanced the following mechanism for the reaction:

$$RNH_2 + HCHO \rightarrow RNHCH_2OH$$
$$RNHCH_2OH + HCOOH \rightarrow$$
$$RNHCH_2OCHO \rightarrow RNHCH_3 + CO_2$$

Since the results with formic acid and formaldehyde duplicate those with diazo methane, methylation must occur and this methylation probably takes place on the nitrogen atom. This methylation probably does not result in complete conversion to the tertiary amine but it is possible that some of that product may be produced. However, the invention is not limited by any theory as to the point at which methylation takes place.

The data also show that the results are not specific for soybean cephalin and cephalin from any source may be used. Thus cephalins containing any fatty acid radicals, as well as both alpha and beta cephalins may be employed.

Also it is to be understood that the invention is not necessarily limited to the use of the particular methylating agents employed in the examples but rather that the invention resides broadly in the methylation of the cephaline by any suitable methylating agent, and to the methylated product.

Having described the invention what is claimed is:

1. As a new compound, methylated cephalin.

2. A composition of matter consisting essentially of methylated soybean cephalin.

3. The process which comprises reacting cephalin with a methylating agent for cephalin to produce methylated cephalin.

4. The process which comprises reacting the cephalin in a mixture of soybean phosphatides with a methylating agent for cephalin to produce methylated cephalin.

5. The process which comprises reacting cephalin with a methylating agent selected from the class consisting of diazo methane and a mixture of formic acid and formaldehyde to produce methylated cephalin.

6. The process which comprises reacting the cephalin in a mixture of soybean phosphatides with a methylating agent selected from the class consisting of diazo methane and a mixture of formic acid and formaldehyde to methylate the cephalin in the phosphatide mixture.

7. The process which comprises subjecting an oil-free mixture of soybean phosphatides to the action of diazo methane to methylate the cephalin in the phosphatide mixture.

8. The process which comprises subjecting an oil-free mixture of soybean phosphatides to the action of a mixture of formic acid and formaldehyde to methylate the cephalin in the phosphatide mixture.

PERCY L. JULIAN.
EDWIN W. MEYER.
HERBERT T. IVESON.